(12) United States Patent
Chen et al.

(10) Patent No.: US 10,579,016 B2
(45) Date of Patent: Mar. 3, 2020

(54) ADDRESSING METHOD OF SPATIAL LIGHT MODULATOR, HOLOGRAPHIC DISPLAY DEVICE AND CONTROL METHOD THEREOF

(71) Applicant: BOE TECHNOLOGY GROUP CO., LTD., Beijing (CN)

(72) Inventors: Hao Chen, Beijing (CN); Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 15/921,599

(22) Filed: Mar. 14, 2018

(65) Prior Publication Data

US 2018/0267468 A1   Sep. 20, 2018

(30) Foreign Application Priority Data

Mar. 17, 2017   (CN) .......................... 2017 1 0164952

(51) Int. Cl.
    *G03H 1/00*   (2006.01)
    *G03H 1/22*   (2006.01)
    (Continued)

(52) U.S. Cl.
    CPC .......... *G03H 1/2294* (2013.01); *G03H 1/0005* (2013.01); *G03H 1/02* (2013.01);
    (Continued)

(58) Field of Classification Search
    None
    See application file for complete search history.

(56) References Cited

U.S. PATENT DOCUMENTS 6,310,591 B1   10/2001   Morgan et al.
9,799,277 B1 *  10/2017   Derckx ................ G09G 3/3433
                          (Continued)

FOREIGN PATENT DOCUMENTS

CN       1745326 A    3/2006
CN     101421664 A    4/2009
                          (Continued)

OTHER PUBLICATIONS

Office Action received for Chinese Patent Application No. 201710164953.5, dated Aug. 15, 2018, 11 pages (5 pages of English Translation and 6 pages of Office Action).
(Continued)

*Primary Examiner* — Jayanti K Patel
*Assistant Examiner* — Shadan E Haghani
(74) *Attorney, Agent, or Firm* — Womble Bond Dickinson (US) LLP (57) ABSTRACT

The present disclosure relates to the field of display technology and provides an addressing method of a spatial light modulator, a holographic display device and a control method thereof, which can simplify the addressing process of the spatial light modulator. The addressing method of the spatial light modulator comprises the steps of: dividing the spatial light modulator to obtain one or more modulation regions, each modulation region comprising M loading subregions, and each loading subregion comprising at least one pixel unit, wherein M≥2, and M is a positive integer; and addressing one loading subregion of each modulation region within a frame so as to load holographic data of a frame of a hologram to all the pixel units of all the addressed loading subregions.

16 Claims, 4 Drawing Sheets

(51) Int. Cl.
*G03H 1/02* (2006.01)
*G03H 1/08* (2006.01)
*G03H 1/30* (2006.01)

(52) U.S. Cl.
CPC ............... *G03H 2001/0088* (2013.01); *G03H 2001/0224* (2013.01); *G03H 2001/0858* (2013.01); *G03H 2001/2297* (2013.01); *G03H 2001/303* (2013.01); *G03H 2225/22* (2013.01)

(56) References Cited

U.S. PATENT DOCUMENTS

| | | | |
|---|---|---|---|
| 9,811,052 B2* | 11/2017 | Kim | G03H 1/0808 |
| 10,353,344 B2* | 7/2019 | Zschau | G03H 1/0808 |
| 2003/0228154 A1 | 12/2003 | Kiser et al. | |
| 2004/0160655 A1 | 8/2004 | Hewlett et al. | |
| 2005/0270615 A1 | 12/2005 | Karlin | |
| 2007/0216985 A1 | 9/2007 | Woodall et al. | |
| 2008/0259419 A1 | 10/2008 | Wilson et al. | |
| 2008/0278780 A1 | 11/2008 | Stanley | |
| 2009/0128464 A1 | 5/2009 | Sugimoto et al. | |
| 2010/0027083 A1 | 2/2010 | Kroll et al. | |
| 2014/0104664 A1 | 4/2014 | Lee et al. | |
| 2015/0009547 A1 | 1/2015 | Ngcobo et al. | |
| 2017/0116939 A1* | 4/2017 | Li | G09G 3/3648 |
| 2017/0146953 A1 | 5/2017 | Wu et al. | |
| 2018/0204541 A1* | 7/2018 | Chaji | G09G 5/10 |
| 2018/0217554 A1* | 8/2018 | Kroll | G02B 26/0875 |

FOREIGN PATENT DOCUMENTS

| | | |
|---|---|---|
| CN | 101563659 A | 10/2009 |
| CN | 101589337 A | 11/2009 |
| CN | 104950654 A | 9/2015 |
| CN | 205405072 U | 7/2016 |
| CN | 106647214 A | 5/2017 |
| CN | 106873340 A | 6/2017 |
| JP | 2007-041329 A | 2/2007 |
| WO | 2004/068210 A1 | 8/2004 |
| WO | 2008/049910 A1 | 5/2008 |

OTHER PUBLICATIONS

Office Action received for Chinese Patent Application No. 201710164952.0, dated Sep. 14, 2018, 16 pages (9 pages of English Translation and 7 pages of Office Action).

* cited by examiner

ADDRESSING METHOD OF SPATIAL LIGHT MODULATOR, HOLOGRAPHIC DISPLAY DEVICE AND CONTROL METHOD THEREOF

RELATED APPLICATIONS

The present application claims the benefit of Chinese Patent Application No. 201710164952.0, filed on Mar. 17, 2017, the entire disclosure of which is incorporated herein by reference.

TECHNICAL FIELD

The present invention relates to the field of display technology, and more particular to an addressing method of a spatial light modulator, a holographic display device and a control method thereof.

BACKGROUND ART

With the increasing popularity and use of 3D display technology, holographic display technology has gradually entered into people's lives and work. Different from parallax stereoscopic display technology, holographic display technology has many advantages, for example, it has a large depth of field and will not cause dizziness.

SUMMARY

The inventors of the present invention realize that with the increasing improvement of resolution of a holographic display device, the data computation amount will also rise during the holographic display process, and the image loading time becomes longer, such that the holographic display device has a lower image refresh rate and a poorer display effect during dynamic holographic display.

To address or alleviate at least one defect in the prior art, there are provided, according to several aspects of the present invention, an addressing method of a spatial light modulator, a holographic display device and a control method thereof so as to simplify the addressing process of the spatial light modulator.

According to one aspect of the present invention, there is provided an addressing method of a spatial light modulator. The addressing method comprises the steps of: dividing the spatial light modulator to obtain one or more modulation regions, each modulation region comprising M loading subregions, and each of the loading subregions comprising at least one pixel unit, wherein M≥2, and M is a positive integer; and addressing one loading subregion of each modulation region within a frame so as to load holographic data of a frame of a hologram to all the pixel units of all the addressed loading subregions.

In an embodiment, before the step of addressing one loading subregion of each modulation region, the addressing method further comprises the steps of: obtaining a plurality of continuous frames of the hologram; according to the display order of the plurality of frames of the hologram, sorting the addressing orders of all the loading subregions of each modulation region so as to make at least a portion of frames of the hologram correspond to the loading subregions of each modulation region in a one-to-one relationship; and according to the sorting result, obtaining the current loading subregion of each modulation region. The step of addressing one loading subregion of each modulation region comprises the step of addressing the current loading subregion of each modulation region so as to load the homographic data of the frame of the hologram corresponding to the current loading subregion of each modulation region to all the pixel units of all the current loading subregions.

In an embodiment, the step of dividing the spatial light modulator comprises the steps of: dividing each modulation region into a first loading subregion and a second loading subregion; the first loading subregion consisting of odd rows of pixel units, and the second loading subregion consisting of even rows of pixel units; or the first loading subregion consisting of odd columns of pixel units, and the second loading subregion consisting of even columns of pixel units.

In an embodiment, the step of dividing the spatial light modulator comprises the step of: dividing each modulation region into four loading subregions with each having a pixel unit.

According to another aspect of the present invention, there is provided a control method of a holographic display device, comprising any addressing method of a spatial light modulator as stated above. The control method further comprises the step of providing a read-out light for the spatial light modulator.

In an embodiment, after the step of obtaining the current loading subregion, the control method further comprises the step of only transmitting an output light of the current loading subregion of each modulation region.

According to another aspect of the present invention, there is provided a holographic display device. The holographic display device may comprise a spatial light modulator, the spatial light modulator may comprise a plurality of modulation regions, each modulation region may comprise M loading subregions, and each of the loading subregions may comprise at least one pixel unit, wherein M≥2, and M is a positive integer. The holographic display device may also comprise a controller connected with the spatial light modulator, and the controller may be configured to address one loading subregion of each modulation region within a frame so as to load the holographic data of the frame of the hologram to all the pixel units of the addressed loading subregion of all the modulation regions.

In an embodiment, the holographic display device may also comprise a light controller disposed at a light-emitting side of the spatial light modulator, the light controller is connected with the controller and may be configured to only transmit the output light of the current loading subregion of each modulation region under the control of the controller.

In an embodiment, each modulation region comprises a first loading subregion and a second loading subregion, and the controller comprises a first sub-controller and a second sub-controller, which are respectively configured to address the pixel unit of the first loading subregion and that of the second loading subregion.

In an embodiment, the first loading subregion consists of odd rows of pixel units of a corresponding modulation region, and the second loading subregion consists of even rows of pixel units of a corresponding modulation region. Or alternatively, the first loading subregion consists of odd columns of pixel units of a corresponding modulation region, and the second loading subregion consists of even columns of pixel units of a corresponding modulation region.

In an embodiment, the holographic display device may also comprise a light source unit disposed at a light-incident side of the spatial light modulator, and the light source unit may be configured to provide a read-out light for the spatial light modulator.

In an embodiment, the light source unit may comprise a laser and a collimated beam expander disposed at a light-emitting side of the laser. Or alternatively, the light source unit may comprise an LED light source.

In an embodiment, the light controller may comprise a liquid crystal grating.

In an embodiment, the spatial light modulator may comprise a liquid crystal spatial light modulator.

In some embodiments of the present disclosure, firstly, the spatial light modulator is divided to obtain one or more modulation regions arranged in the form of a matrix, each modulation region may comprise M loading subregions, and each loading subregion may comprise at least one pixel unit, wherein M≥2, and M is a positive integer. Then, one loading subregion of each modulation region can be addressed within a frame so as to load holographic data of a frame of a hologram to all the pixel units of all the addressed loading subregions. As such, when a frame of a hologram is displayed, it is only required to address, within each frame, one loading subregion of each modulation region of the spatial light modulator, rather than address all the pixel units of the spatial light modulator, which can simplify the addressing process and reduce the data computation amount. Thus, when a holographic display device made of the spatial light modulator is used for holographic display, it can reduce the time for loading the hologram and further increase the display image refresh rate during the dynamic holographic display by the holographic display device.

BRIEF DESCRIPTION OF DRAWINGS

To explain the technical solutions of some embodiments of the present disclosure more clearly, the present disclosure provides the following drawings for use when describing the embodiments. It shall be appreciated that the following drawings are only related to some embodiments. Without making inventive labor, those ordinarily skilled in the art can also obtain other drawings according to these drawings, and the other drawings are within the scope of the present invention.

REFERENCE SIGNS

10 Spatial light modulator; 11 Modulation region; 110 Loading subregion; 1101 First loading subregion; 1102 Second loading subregion; 1103 Third loading subregion; 1104 Fourth loading subregion; 111 Pixel unit; 20 Light source unit; 21 Laser; 201 Collimated beam expander; 202 LED light source; 30 Controller; 301 First subcontroller; 302 Second subcontroller; 40 Light controller; 22 Object; 23 Holographic dry plate; A Object light wave; and B Reference wave.

DETAILED DESCRIPTION

To understand the object, technical solutions and advantages of some embodiments more clearly, these embodiments will be described in detail with reference to the drawings. Those ordinarily skilled in the art can realize that the embodiments described herein are merely a part, not the whole, of the embodiments of the present invention. On the basis of the embodiments in the present disclosure, those ordinarily skilled in the art can obtain other embodiments without making inventive labour. All the obtained other embodiments fall within the scope of the present invention.

Figure 1:
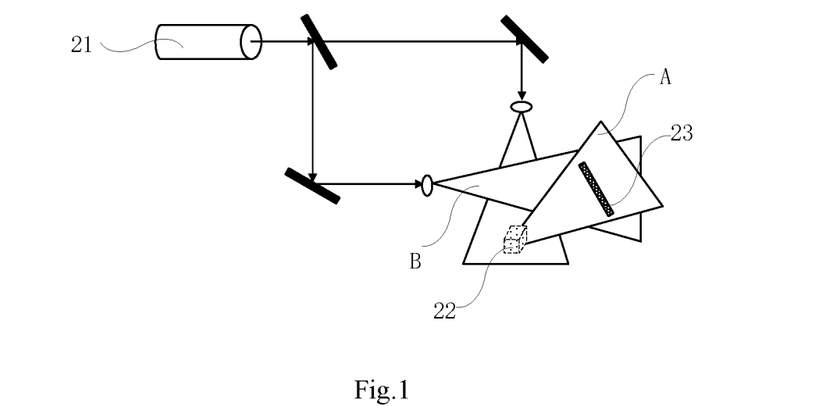
FIG. 1 is a schematic view showing a holographic display principle.

Holographic display technology is related to optical holographic imaging based on the principles of light interference and diffraction. As shown in FIG. 1, lights emitted from a laser 21 are divided into two beams. One light beam is irradiated to an object 22, and reflected and scattered light from the surface of the object 22 reaches a holographic dry plate 23 to form an object light wave A. The other light beam that is coherent with the object light wave A is irradiated as a reference wave B to the holographic dry plate 23 to expose the holographic dry plate 23, so as to record the information on phase and amplitude of the object light wave A in the form of interference fringes on the holographic dry plate 23. Then, according to the principle of light wave diffraction, the light that is coherent with the object light wave A is irradiated onto the holographic dry plate 23 having the interference fringes to reproduce the original object light wave A to form a 3D image of the object 22.

However, since the holographic dry plate 23 is provided with a photosensitive material, the interference fringes recorded on the holographic dry plate 23 after being exposed cannot be changed, so that it is difficult to achieve dynamic display. Thus, for the sake of dynamic holographic display, the computer generated hologram (CGH) technology can be used to directly input the mathematical description function of the object light wave A into a computer to simulate the actual interference process, thereby calculating interference fringes and drawing a calculated hologram.

In an implementation, the process of calculating and drawing a hologram may comprise the following steps:

Firstly, the values of the object 22 or the wave surface at discrete sample points are sampled;

Then, the light field distribution of the object light wave A on the holographic plane is calculated;

Then, encoding is conducted, so as to encode the complex amplitude distribution of the optical wave on the holographic plane into a transmittance change of the hologram;

Finally, a picture is drawn, i.e., the transmittance change of the hologram is drawn into a drawing under the control of a computer. If a drawing device does not have enough resolution, then a larger picture is drawn and then reduced in its size to a desired hologram.

A computer loads the calculated hologram to every pixel unit of a spatial light modulator (SLM) by means of optical addressing or electric addressing so as to reproduce the calculated hologram in an actual optical path. FIGS. 3, 4, 6 and 7 show exemplary structures and configurations of the spatial light modulator 10 and the pixel unit 111 thereof.

Figure 2:
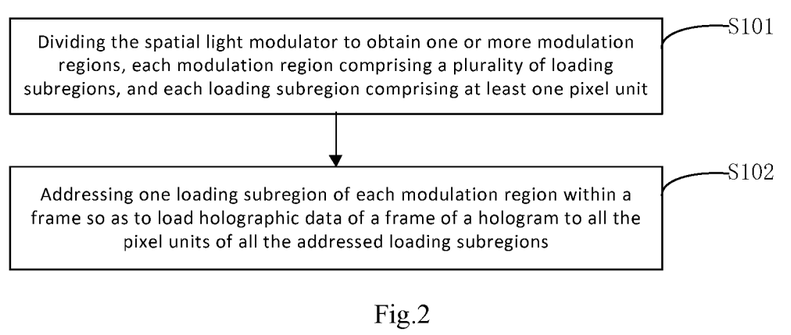
FIG. 2 is a flow chart of an addressing method of a spatial light modulator according to an embodiment of the present invention.

FIG. 2 is a flow chart of an addressing method of a spatial light modulator according to an embodiment of the present invention. As shown in FIG. 2, the method may comprise steps S101 and S102.

Figure 3:
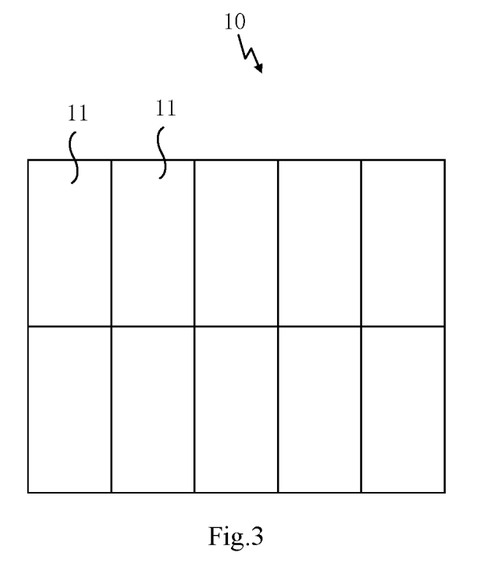
FIG. 3 is a schematic view showing division of the spatial light modulator in step S101 of FIG. 2.
Figure 4:
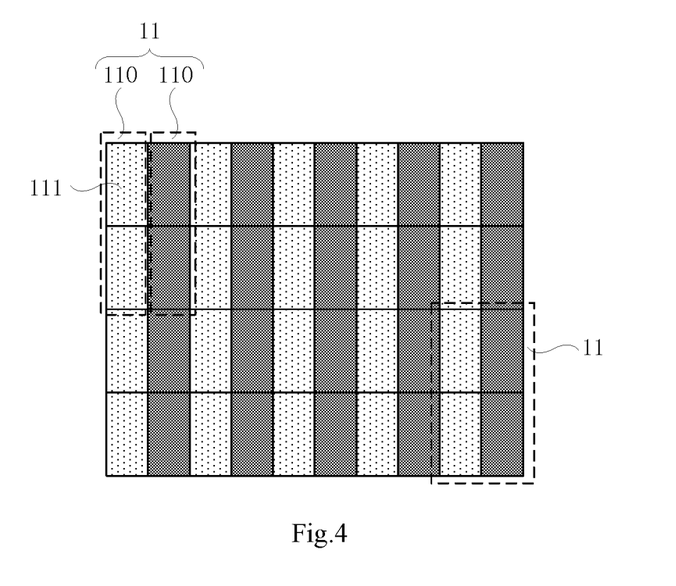
FIG. 4 is a specific structural schematic view of a modulation region shown in FIG. 3.

In S101, the spatial light modulator 10 shown in FIG. 3 is divided to obtain one or more modulation regions 11. In an embodiment, the multiple modulation regions 11 may be arranged in the form of a matrix. As shown in FIG. 4, each modulation region 11 may comprise M loading subregions 110, and each of the loading subregions 110 comprises at least one pixel unit 111, wherein M≥2, and M is a positive integer.

In S102, one loading subregion 110 of each modulation region 11 is addressed within a frame so as to load holographic data of a frame of a hologram to all the pixel units 111 of all the addressed loading subregions 110.

As such, when a frame of a hologram is displayed, it is only required to address, within a frame, one loading subregion 110 of each modulation region 11 of the spatial light modulator 10, rather than address all the pixel units 111 of the spatial light modulator 10, which can simplify the addressing process and reduce the data computation amount. Thus, when a holographic display device made of the spatial light modulator 10 is used for holographic display, it can reduce the time for loading the hologram and further increase the display image refresh rate during the dynamic holographic display by the holographic display device.

On that basis, during the dynamic holographic display, the addressing orders of the loading subregions 110 of each modulation region 11 can be set according to the display order of a plurality of continuous frames of the hologram, so that the addressing orders of the loading subregions 110 of each modulation region 11 are the same in order to facilitate unified control and management.

Figure 5:
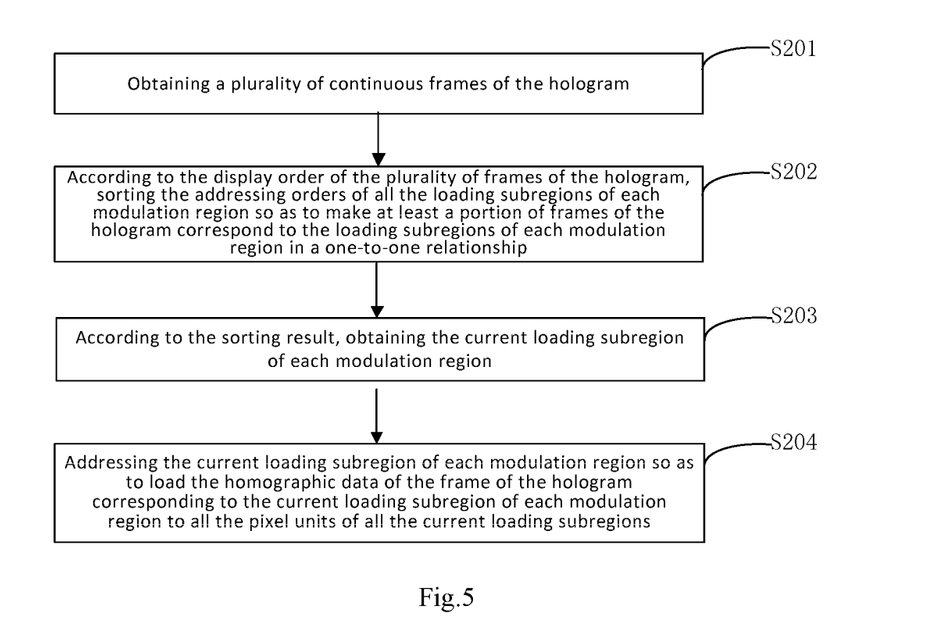
FIG. 5 is a flow chart of an addressing method of another spatial light modulator according to an embodiment of the present invention.

To this end, there is provided an addressing method of another spatial light modulator according to an embodiment of the present invention. FIG. 5 illustrates the flow chart of such an addressing method. As shown in FIG. 5, before the step S102, the addressing method also comprises steps S201 to S204.

In S201, a plurality of continuous frames of the hologram are obtained. The plurality of continuous frames of the hologram required for display during the dynamic holographic display can be drawn respectively according to the holographic computation for the sake of obtaining a plurality of continuous frames of the hologram. The process of the holographic computation is the same as stated above and will not be reiterated herein.

In S202, according to the display order of the plurality of frames of the hologram, the addressing orders of all the loading subregions 110 of each modulation region 11 are sorted so as to make at least a portion of frames of the hologram correspond to the loading subregions 110 of each modulation region 11 in a one-to-one relationship.

What shall be explained is that the present invention imposes no limitation to the relationship between the number of frames of the hologram obtained in the step S201 and the number of the loading subregions 110 of each modulation region 11. If resolution is a factor to be considered when calculating the manufacturing cost, the number of frames of the hologram obtained in the step S201 is usually greater than the number of the loading subregions 110 of each modulation region 11 during the process of dynamic holographic display. Under such circumstances, since the hologram is loaded to only one loading subregion 110 of each modulation region 11 within a frame, when the number of frames of the hologram obtained in the step S201 is greater than the number of the loading subregions 110 of each modulation region 11, the step of making at least a portion of frames of the hologram correspond to the loading subregions 110 of each modulation region 11 in a one-to-one relationship may further comprise the step of, according to the display order of the plurality of frames of the hologram obtained in the step S201, sorting the addressing orders of all the loading subregions 110 of each modulation region 11 so as to make a portion of frames of the hologram, the number of which is the same as the number of the loading subregions 110 of each modulation region 11, correspond to the loading subregions 110 of each modulation region 11 in a one-to-one relationship.

The corresponding manner is closely associated with the manner of dividing the spatial light modulator 10. If the manner of dividing the spatial light modulator 10 in the step S101 is different, then the manner of making the loading subregions 110 of each modulation region 11 correspond to the plurality of frames of the hologram will be different, too.

Figure 6:
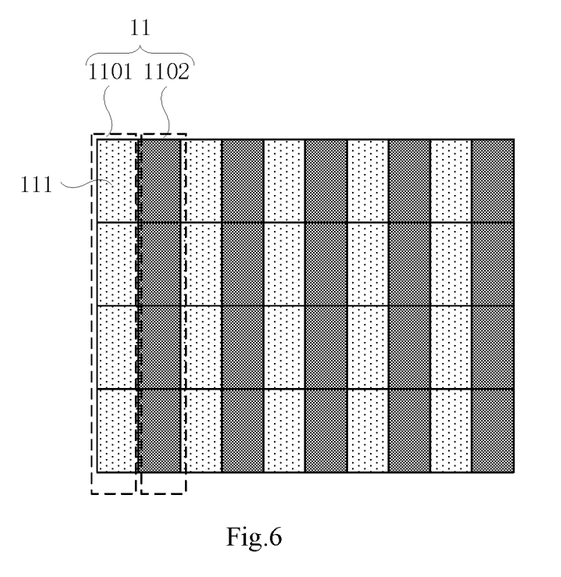
FIG. 6 is another schematic view showing the division of the spatial light modulator in step S101 of FIG. 2.

For instance, FIG. 6 illustrates another schematic view showing the division of the spatial light modulator in the step S101 of FIG. 2. As shown in FIG. 6, the spatial light modulator 10 can be divided such that each modulation region 11 comprises a first loading subregion 1101 and a second loading subregion 1102. In an embodiment, the first loading subregion 1101 consists of odd rows of the pixel units 111, and the second loading subregion 1102 consists of even rows of the pixel units 111. Or alternatively, the first loading subregion 1101 consists of odd columns of the pixel units 111, and the second loading subregion 1102 consists of even columns of the pixel units 111.

Under such circumstances, take the continuous eight frames of the hologram obtained in the step S201 for example, the step S202 can be further implemented in the following manner. According to the display order of the plurality of frames of the hologram, the addressing orders of all the loading subregions 110 of each modulation region 11 are that: first, the first loading subregion 1101 is addressed; then, the second loading subregion 1102 is addressed; and the above addressing order is repeated so as to make the first frame of the hologram and the second frame of the hologram respectively correspond to the first loading subregion 1101 and the second loading subregion 1102 of each modulation region 11, such that the holographic data of the first frame of the hologram can be loaded to all the first loading subregions 1101 of all the modulation regions 11, and the holographic data of the second frame of the hologram be loaded to all the second loading subregions 1102 of all the modulation regions 11. Next, the above steps are repeated for the following frames of the hologram, such that the first loading subregion 1101 of each modulation region 11 can correspond to odd frames (or even frames) of the hologram, and the second loading subregion 1102 of each modulation region 11 can correspond to even frames (or odd frames) of the hologram.

Figure 7:
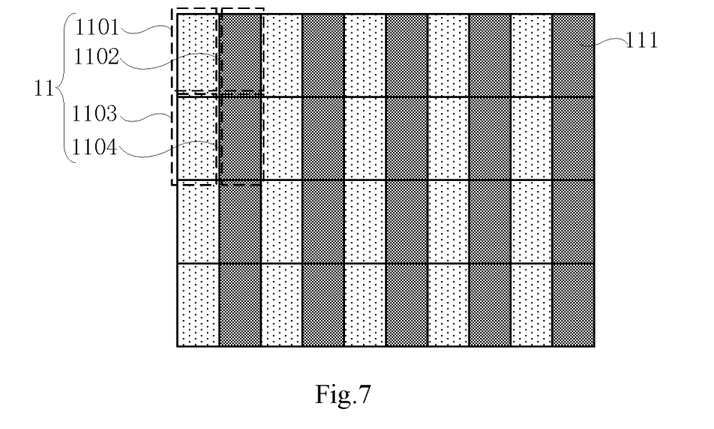
FIG. 7 is a further schematic view showing the division of the spatial light modulator in step S101 of FIG. 2.

FIG. 7 is a further schematic view showing the division of the spatial light modulator in step S101 of FIG. 2. For instance, as shown in FIG. 7, the spatial light modulator 10 can be divided such that each modulation region 11 comprises four loading subregions, namely a first loading subregion 1101, a second loading subregion 1102, a third loading subregion 1103 and a fourth loading subregion 1104. In an implementation, each loading subregion has a pixel unit 111.

Under such circumstances, take the continuous eight frames of the hologram obtained in the step S201 for example, the step S202 can be implemented in the following manner. According to the display order of the plurality of frames of the hologram, the addressing orders of all the loading subregions 110 of each modulation region 11 are sequentially the first loading subregion 1101, the second loading subregion 1102, the third loading subregion 1103 and the fourth loading subregion 1104. Then, the above addressing orders is repeated so as to make the first frame of the hologram, the second frame of the hologram, the third frame of the hologram and the fourth frame of the hologram correspond to the first loading subregion 1101, the second loading subregion 1102, the third loading subregion 1103 and the fourth loading subregion 1104 of each modulation region 11 respectively. In doing so, the holographic data of the first frame of the hologram can be loaded to all the first loading subregions 1101 of all the modulation regions 11, the holographic data of the second frame of the hologram can be loaded to all the second loading subregions 1102 of all the modulation regions 11, the holographic data of the third frame of the hologram can be loaded to all the third loading subregions 1103 of all the modulation regions 11, and the holographic data of the fourth frame of the hologram can be loaded to all the fourth loading subregions 1104 of all the modulation regions 11. Then, the above steps are repeated so as to make the fifth frame of the hologram, the sixth frame of the hologram, the seventh frame of the hologram and the eighth frame of the hologram correspond to the first loading subregion 1101, the second loading subregion 1102, the third loading subregion 1103 and the fourth loading subregion 1104 of each modulation region 11 respectively. In doing so, the holographic data of the fifth frame of the hologram can be loaded to all the first loading subregions 1101 of all the modulation regions 11, the holographic data of the sixth frame of the hologram can be loaded to all the second loading subregions 1102 of all the modulation regions 11, the holographic data of the seventh frame of the hologram can be loaded to all the third loading subregions 1103 of all the modulation regions 11, and the holographic data of the eighth frame of the hologram can be loaded to all the fourth loading subregions 1104 of all the modulation regions 11.

Of course, the above explanation is made by taking the continuous eight frames of the hologram obtained in the step S201 for example. If the number of the holograms obtained in the step S201 varies, the manner of making the loading subregions 110 of each modulation region 11 correspond to the plurality of frames of the hologram may be the one as stated above, which will not be reiterated.

In S203, according to the sorting result, the current loading subregion of each modulation region 11 is obtained. For example, if the manner of dividing the spatial light modulator 10 is the one shown in FIG. 6 or 7, when the first frame of the hologram needs to be displayed, since the first frame of the hologram corresponds to the first loading subregion 1101, the first loading subregion 1101 is the current loading subregion.

When the third frame of the hologram needs to be displayed, if the manner of dividing the spatial light modulator 10 is the one shown in FIG. 6, since the third frame of the hologram corresponds to the first loading subregion 1101, the first loading subregion 1101 is the current loading subregion. If the manner of dividing the spatial light modulator 10 is the one shown in FIG. 7, since the third frame of the hologram corresponds to the third loading subregion 1103, the third loading subregion 1103 is the current loading subregion.

Step S204 is an implementation of the step S102. As shown in FIG. 5, the step S204 may comprise the step of addressing the current loading subregion of each modulation region 11 so as to load the holographic data of the frame of the hologram corresponding to the current loading subregion of each modulation region 11 to all the pixel units 111 of all the current loading subregions.

If the manner of dividing the spatial light modulator 10 is the one shown in FIG. 6, when the first loading subregion 1101 is the current loading subregion, the holographic data of odd frames (or even frames) of the hologram are sequentially loaded to all the pixel units 111 in the first loading subregions 1101 of all the modulation regions 11 according to the display order. At this time, the loaded hologram can be reproduced by enabling the odd columns (or even columns) of the pixel units 111 to display images, and the even columns (or odd columns) of the pixel units 111 that do not display images are placed in a to-be-loaded state. In addition, when the second loading subregion 1102 is the current loading subregion, the holographic data of even frames (or odd frames) of the hologram are sequentially loaded to all the pixel units 111 in the second loading subregions 1102 of all the modulation regions 11 according to the display order. At this time, the loaded hologram can be reproduced by enabling the even columns (or odd columns) of the pixel units 111 to display images, and the odd columns (or even columns) of the pixel units 111 that do not display images are placed in a to-be-loaded state.

In doing so, the even columns of the pixel units 111 and the odd columns of the pixel units 111 can load the holographic data of two adjacent frames alternately by means of alternate addressing, so as to dynamically display the plurality of continuous frames of the hologram. Since, within each frame, there is only one loading subregion 110 in each modulation region 11 of the spatial light modulator 10, i.e. the current loading subregion, that is addressed, the addressing process can be simplified and the data computation amount be reduced.

If the manner of dividing the spatial light modulator 10 is the one shown in FIG. 7, take the continuous eight frames of the hologram obtained in the step S201 for example, when the first loading subregion 1101 is the current loading subregion, the holographic data of the first frame of the hologram or the fifth frame of the hologram are loaded to all the pixel units 111 of the first loading subregions 1101 of all the modulation regions 11; when the second loading subregion 1102 is the current loading subregion, the holographic data of the second frame of the hologram or the sixth frame of the hologram are loaded to all the pixel units 111 of the second loading subregions 1102 of all the modulation regions 11; when the third loading subregion 1103 is the current loading subregion, the holographic data of the third frame of the hologram or the seventh frame of the hologram are loaded to all the pixel units 111 of the third loading subregions 1103 of all the modulation regions 11; and when the fourth loading subregion 1104 is the current loading subregion, the holographic data of the fourth frame of the hologram or the eighth frame of the hologram are loaded to all the pixel units 111 of the fourth loading subregions 1104 of all the modulation regions 11.

Then, when the current loading subregion loaded with the hologram is reproduced, all the pixel units 111 in the current loading subregion of each modulation region 11 can be used to display, and the pixel units 111 in other loading subregions are in a to-be-loaded state. In this manner, the first loading subregion 1101, the second loading subregion 1102, the third loading subregion 1103 and the fourth loading subregion 1104 display the first frame of the hologram, the second frame of the hologram, the third frame of the hologram and the fourth frame of the hologram sequentially, and then the first loading subregion 1101, the second loading subregion 1102, the third loading subregion 1103 and the fourth loading subregion 1104 again display the fifth frame of the hologram, the sixth frame of the hologram, the seventh frame of the hologram and the eighth frame of the hologram sequentially so as to dynamically display the plurality of continuous frames of the hologram. Since, within each frame, there is only one loading subregion 110 in each modulation region 11 of the spatial light modulator 10, i.e. the current loading subregion, that is addressed, the addressing process can be simplified and the data computation amount be reduced.

According to another aspect of the present invention, there is provided a control method of a holographic display device, which comprises any addressing method of the spatial light modulator as stated above. The control method of the holographic display device further comprises the step of providing a read-out light for the spatial light modulator. Thus, the read-out light can be diffracted by the interference fringes loaded to the spatial light modulator to reproduce the hologram and form a 3D image. The control method of the holographic display device has the same advantageous effects as the addressing method of the spatial light modulator, which will not be reiterated herein.

During the display process of the holographic display device, it is only required to address a portion of the pixel units 111 of the spatial light modulator within each frame so as to enable the portion of the pixel units 111 to display images. Thus, in order to prevent the light transmitting the unaddressed pixel unit 111 from interfering with the output light emitted from the pixel unit 111 which is displaying images, in an embodiment, after obtaining the current loading subregion, the control method further comprises the step of only transmitting an output light of the current loading subregion of each modulation region 11, so as to improve the display effect.

Figure 8:
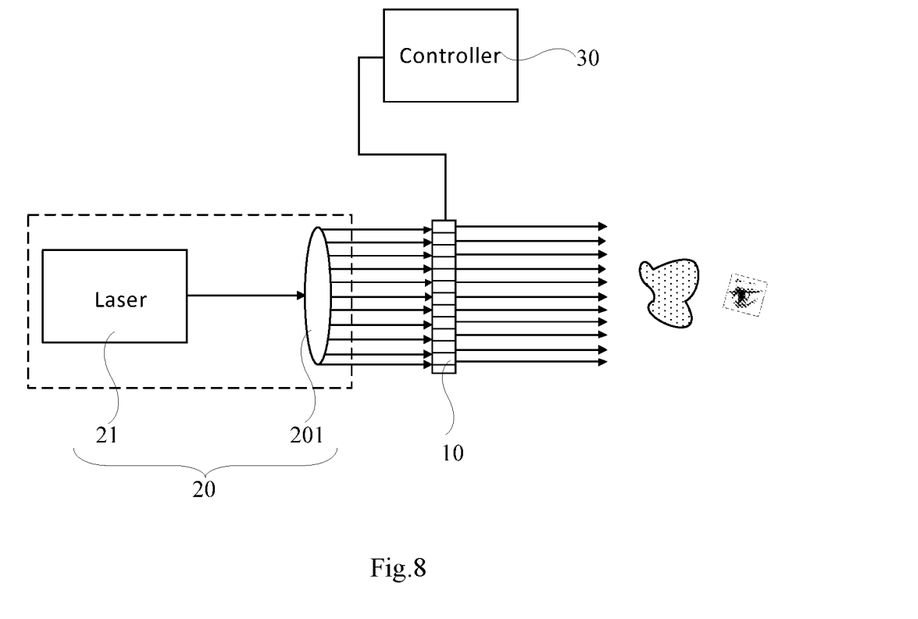
FIG. 8 is a structural schematic view of a holographic display device according to an embodiment of the present invention.

According to another aspect of the present invention, there is provided a holographic display device. FIG. 8 is a structural schematic view of a holographic display device according to an embodiment of the present invention. As shown in FIG. 8, the holographic display device may comprise a spatial light modulator 10, which may comprise one or more modulation regions 11 as shown in FIGS. 3, 4, 6 and 7. In an embodiment, the one or more modulation regions 11 are arranged in the form of a matrix. Each modulation region 11 as shown in FIGS. 4, 6 and 7 may comprise M loading subregions 110, each of which comprises at least one pixel unit 111, wherein M≥2, and M is a positive integer.

In an embodiment, the spatial light modulator 10 may comprise a liquid crystal spatial light modulator.

In order to provide a read-out light for the spatial light modulator 10, the holographic display device may also comprise a light source unit 20 disposed at a light-incident side of the spatial light modulator 10, and the light source unit 20 may be configured to provide a read-out light for the spatial light modulator 10, such that the read-out light can be diffracted with the interference fringes loaded to the spatial light modulator so as to reproduce the hologram.

In an embodiment, the light source unit 20 may comprise, as shown in FIG. 8, a laser 21 and a collimated beam expander 201 disposed at a light-emitting side of the laser 21. The collimated beam expander 201 may convert a linear light source emitted by the laser 21 into a collimated area light source.

Figure 9:
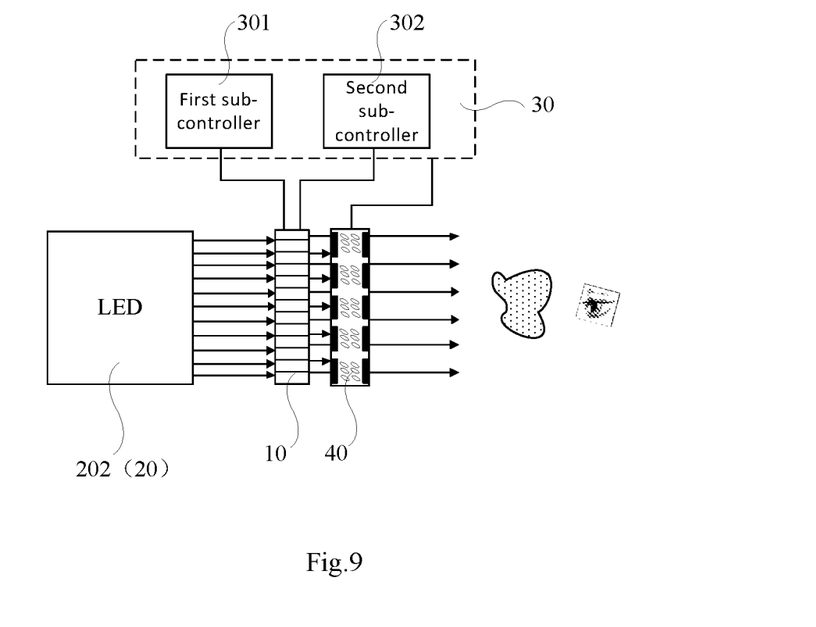
FIG. 9 is a structural schematic view of another holographic display device according to an embodiment of the present invention.

Alternatively, the light source unit 20 may also comprise, as shown in FIG. 9, an LED light source 202, which can emit white light.

In addition, for the sake of writing of the holographic data, the holographic display device may also comprise a controller 30 connected with the spatial light modulator 10, and the controller 30 may be configured to address one loading subregion of each modulation region within a frame so as to load the holographic data of the frame of the hologram to all the pixel units 111 of the addressed loading subregions 110 of all the modulation regions 11. For example, the controller 30 may address the pixel units 111 by means of optical writing or electric writing so as to write the holographic data to corresponding pixel units 111 according to the addressing result.

FIG. 9 is a structural schematic view of another holographic display device according to an embodiment of the present invention. As shown in FIG. 9, the controller 30 may comprise a first sub-controller 301 and a second sub-controller 302, wherein each modulation region comprises the first loading subregion and the second loading subregion, and the first sub-controller 301 and the second sub-controller 302 can be respectively configured to address the pixel unit of the first loading subregion and that of the second loading subregion. In an embodiment, the first loading subregion consists of odd rows of pixel units of a corresponding modulation region, and the second loading subregion consists of even rows of pixel units of a corresponding modulation region. Thus, the first sub-controller 301 can be configured to address the odd rows of the pixel units 111 in the spatial light modulator 10, and the second sub-controller 302 can be configured to address the even rows of the pixel units 111 in the spatial light modulator 10. Or alternatively, the first loading subregion consists of odd columns of pixel units of a corresponding modulation region, and the second loading subregion consists of even columns of pixel units of a corresponding modulation region. Thus, the first sub-controller 301 can be configured to address the odd columns of the pixel units 111 in the spatial light modulator 10, and the second sub-controller 302 can be configured to address the even columns of the pixel units 111 in the spatial light modulator 10. In doing so, the odd rows (or columns) and even rows (or columns) of the pixel units 111 can be independently addressed by different sub-controllers respectively during the holographic display process. There is no need to judge, before addressing, whether the loaded data belong to the odd rows (or columns) or the even rows (or columns) of the pixel units 111, and the cross interference between data loaded to the odd rows (or columns) and the even rows (or columns) of the pixel units 111 can be avoided, thereby increasing the speed and accuracy of data processing.

To sum up, when a frame of a hologram is displayed, it is only required to address, within each frame, one loading subregion 110 of each modulation region 11 of the spatial light modulator 10, rather than address all the pixel units 111 of the spatial light modulator 10, which can simplify the addressing process and reduce the data computation amount. Thus, when a holographic display device made of the spatial light modulator 10 is used for holographic display, it can reduce the time for loading the hologram and further increase the display image refresh rate during the dynamic holographic display by the holographic display device.

Furthermore, during the display process of the holographic display device, it is only required to address a portion of the pixel units 111 of the spatial light modulator within each frame so as to enable the portion of the pixel units 111 to display images. Thus, in order to prevent the light transmitting the unaddressed pixel unit 111 from interfering with the output light emitted from the pixel unit 111 which is displaying images, in an embodiment, the holographic display device, as shown in FIG. 9, may also comprise a light controller 40 disposed at a light-emitting side of the spatial light modulator 10, the light controller 40 is connected with the controller 30 to only transmit the output light of the current loading subregion of each modulation region 11 of the spatial light modulator 10 under the control of the controller 30, thereby improving the display effect of the holographic display device.

In an embodiment, the light controller 40 may comprise a liquid crystal grating. The liquid crystal grating is provided therein with a liquid crystal layer, at both sides of which is there a block electrode. The voltage input to the block electrode can control the deflection angle of liquid crystal molecules in the liquid crystal layer and further adjust the transmittance of the liquid crystal layer at different positions as required in such a way to only transmit the output light of the current loading subregion in each modulation region 11 of the spatial light modulator 10.

It can be understood that the above embodiments are only exemplary embodiments of the present invention, but the protection scope of the present invention is not limited thereto. It shall be pointed out that those ordinarily skilled in the art can readily conceive of various variations or replacements without departing from the spirit and principle of the present invention. These variations or replacements will fall within the protection scope of the present invention. Thus, the protection scope of the present invention shall be based on the protection scope of the appended claims.

What needs to be explained is that the above embodiments are only illustrated by way of the individual function modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

In the claims, any reference sign in parentheses should not be interpreted as a limitation to the claims. The term "comprise/include" does not exclude the presence of elements or steps other than those listed in the claims. The word "a" or "an" in front of elements does not exclude the presence of a plurality of such elements.

In device or system claims that enumerate several means, one or more of the means can be embodied in one and the same item of hardware. The mere fact that some measures are recited in dependent claims that are different from each other does not indicate that the combination of the measures cannot be used to advantage.

What is claimed is:

1. A control method of a holographic display device, wherein the control method comprises the step of
    dividing the spatial modulator to obtain one of more modulation regions, each modulation region comprising M loading subregions, and each of the loading subregions comprising at least on pixel unit, wherein M≥2, and M is a positive integer;
    addressing one of said M loading subregions of each modulation region when a frame of a hologram is displayed, so as to load holographic data of the frame of the hologram to all the pixel units comprised in all the addressed loading subregions; and
    providing a read-out light for the spatial light modulator, wherein after the step of obtaining the current loading subregions, the control method further comprises a step of only transmitting an output light of the current loading subregion of each modulation region.

2. The control method of a spatial light modulator according to claim 1, wherein before the step of addressing one loading subregion of each modulation region, the addressing method further comprises the steps of:
    obtaining a plurality of continuous frames of the hologram;
    according to the display order of the plurality of frames of the hologram, sorting the addressing orders of all the loading subregions of each modulation region so as to make at least a portion of frames of the hologram correspond to the loading subregions of each modulation region in a one-to-one relationship; and
    according to the sorting result, obtaining the current loading subregion of each modulation region,
    the step of addressing one loading subregion of each modulation region comprises the step of addressing the current loading subregion of each modulation region so as to load the homographic data of the frame of the hologram corresponding to the current loading subregion of each modulation region to all the pixel units of all the current loading subregions.

3. The control method of a spatial light modulator according to claim 2, wherein the step of dividing the spatial light modulator comprises the steps of: dividing each modulation region into a first loading subregion and a second loading subregion;
    the first loading subregion consisting of odd rows of pixel units, and the second loading subregion consisting of even rows of pixel units; or
    the first loading subregion consisting of odd columns of pixel units, and the second loading subregion consisting of even columns of pixel units.

4. The control method of a spatial light modulator according to claim 1, wherein the step of dividing the spatial light modulator comprises the steps of: dividing each modulation region into a first loading subregion and a second loading subregion;
    the first loading subregion consisting of odd rows of pixel units, and the second loading subregion consisting of even rows of pixel units; or
    the first loading subregion consisting of odd columns of pixel units, and the second loading subregion consisting of even columns of pixel units.

5. The control method of a spatial light modulator according to claim 1, wherein the step of dividing the spatial light modulator comprises the step of: dividing each modulation region into four loading subregions with each having a pixel unit.

6. The control method of a spatial light modulator according to claim 1, wherein before the step of addressing one loading subregion of each modulation region, the addressing method further comprises the steps of:
    obtaining a plurality of continuous frames of the hologram;
    according to the display order of the plurality of frames of the hologram, sorting the addressing orders of all the loading subregions of each modulation region so as to make at least a portion of frames of the hologram correspond to the loading subregions of each modulation region in a one-to-one relationship; and
    according to the sorting result, obtaining the current loading subregion of each modulation region, wherein the step of addressing one loading subregion of each modulation region comprises the step of addressing the current loading subregion of each modulation region so as to load the homographic data of the frame of the hologram corresponding to the current loading subregion of each modulation region to all the pixel units of all the current loading subregions.

7. The control method of a spatial light modulator according to claim 6, wherein the step of dividing the spatial light modulator comprises the steps of: dividing each modulation region into a first loading subregion and a second loading subregion;
the first loading subregion consisting of odd rows of pixel units, and the second loading subregion consisting of even rows of pixel units; or
the first loading subregion consisting of odd columns of pixel units, and the second loading subregion consisting of even columns of pixel units.

8. The control method of a spatial light modulator according to claim 1, wherein the step of dividing the spatial light modulator comprises the steps of: dividing each modulation region into a first loading subregion and a second loading subregion;
the first loading subregion consisting of odd rows of pixel units, and the second loading subregion consisting of even rows of pixel units; or
the first loading subregion consisting of odd columns of pixel units, and the second loading subregion consisting of even columns of pixel units.

9. The control method of a spatial light modulator according to claim 1, wherein the step of dividing the spatial light modulator comprises the step of: dividing each modulation region into four loading subregions with each having a pixel unit.

10. A holographic display device comprising:
a spatial light modulator, the spatial light modulator comprising one or more modulation regions, each modulation region comprising M loading subregions, and each of the loading subregions comprising at least one pixel unit, wherein M≥2, and M is a positive integer;
a controller connected with the spatial light modulator and configured to address one of said M loading subregions of each modulation region when a frame of a hologram is displayed, so as to load the holographic data of the frame of the hologram to all the pixel units comprised in all the addressed loading subregion of all the modulation regions; and
a light controller disposed at a light-emitting side of the spatial light modulator, the light controller is connected with the controller and configured to only transmit the output light of the current loading subregion of each modulation region under the control of the controller.

11. The holographic display device according to claim 10, wherein each modulation region comprises a first loading subregion and a second loading subregion, and the controller comprises a first sub-controller and a second sub-controller, which are respectively configured to address the pixel unit of the first loading subregion and that of the second loading subregion.

12. The holographic display device according to claim 11, wherein
the first loading subregion consists of odd rows of pixel units of a corresponding modulation region, and the second loading subregion consists of even rows of pixel units of a corresponding modulation region; or
the first loading subregion consists of odd columns of pixel units of a corresponding modulation region, and the second loading subregion consists of even columns of pixel units of a corresponding modulation region.

13. The holographic display device according to claim 10, further comprising a light source unit disposed at a light-incident side of the spatial light modulator, and the light source unit is configured to provide a read-out light for the spatial light modulator.

14. The holographic display device according to claim 13, wherein the light source unit comprises a laser and a collimated beam expander disposed at a light-emitting side of the laser;
or the light source unit comprises an LED light source.

15. The holographic display device according to claim 10, wherein the light controller comprises a liquid crystal grating.

16. The holographic display device according to claim 10, wherein the spatial light modulator comprises a liquid crystal spatial light modulator.

* * * * *